United States Patent
Li (10) Patent No.: US 11,388,051 B2
(45) Date of Patent: Jul. 12, 2022

(54) ROUTER, METHOD FOR ROUTER, COMPUTER-READABLE MEDIUM, AND APPARATUS

(71) Applicant: ARRIS Enterprises LLC, Suwanee, GA (US)

(72) Inventor: Ju Li, Guangdong (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/333,371

(22) Filed: May 28, 2021

(65) Prior Publication Data

US 2022/0045904 A1 Feb. 10, 2022

(30) Foreign Application Priority Data

Aug. 7, 2020 (CN) .......................... 20201078879134

(51) Int. Cl.
*G06F 15/16* (2006.01)
*H04L 41/0813* (2022.01)
*H04L 9/40* (2022.01)

(52) U.S. Cl.
CPC ...... *H04L 41/0813* (2013.01); *H04L 63/0209* (2013.01)

(58) Field of Classification Search
CPC .................... H04L 41/0813; H04L 63/0209
See application file for complete search history.

(56) References Cited

U.S. PATENT DOCUMENTS

| | | | | |
|---|---|---|---|---|
| 7,246,373 B1 * | 7/2007 | Leung | ................ | H04L 63/0272 713/168 |
| 10,056,978 B2 | 8/2018 | Mattos et al. | | |
| 2008/0291931 A1 * | 11/2008 | Fukuda | ................ | H04L 49/201 370/401 |
| 2012/0239221 A1 * | 9/2012 | Mighdoll | ............... | G05B 15/02 700/300 |
| 2014/0281672 A1 * | 9/2014 | Fu | ....................... | G06F 11/2007 714/4.11 |
| 2018/0013761 A1 * | 1/2018 | Bachar | ................... | H04L 67/10 |

OTHER PUBLICATIONS

International Search Report and the Written Opinion of the International Searching Authority dated Sep. 8, 2021 in International (PCT) Application No. PCT/US2021/034806.

* cited by examiner

*Primary Examiner* — Normin Abedin
(74) *Attorney, Agent, or Firm* — Wenderoth, Lind & Ponack, L.L.P.

(57) ABSTRACT

The present disclosure relates to a router, a method for the router, a computer-readable medium, and an apparatus. A router including: a memory having instructions stored thereon; and a processor configured to execute the instructions stored on the memory to cause the router to perform at least the following: providing a plurality of private subnets isolated from one another, each of the plurality of private subnets having corresponding network configuration information; and in response to a request to perform a first processing on network configuration information from a first user device connected to a first of the plurality of private subnets, performing the first processing on only first network configuration information corresponding to the first private subnet.

22 Claims, 4 Drawing Sheets

ROUTER, METHOD FOR ROUTER, COMPUTER-READABLE MEDIUM, AND APPARATUS

TECHNICAL FIELD

The present disclosure relates to the field of routers, and, in particular, to a router capable of providing a plurality of private subnets.

BACKGROUND

Most of current routers for home use are designed for a family. In a family mode, for the security of a home network, a router is typically able to provide two separated subnets: a primary network and a guest network. The primary network is used by family members, whereas the guest network is temporarily used by guests. To preferentially guarantee the bandwidth for the primary network, the available bandwidth for the guest network is limited. Moreover, equipment within the guest network does not have access to log into a router management interface to view network configuration information.

However, in a case of multi-roommate co-tenancy, providing merely two separated subnets may not be sufficient, and the guest network with limited available bandwidth is not suitable for being allocated to any roommate for use. Thus, the primary network of the router is usually shared by multiple roommates in co-tenancy. However, due to the fact that the firewall function in the router is often only used to filter data traffic from a wide area network side to a local area network side, and rarely blocks traffic in a same local area network, equipment of the roommates can access one another in this scheme, thereby bringing a great security risk.

Similarly, in an enterprise network, there is also a need to provide individual network connections for a plurality of departments sharing a local area network, while ensuring the security of each department's network.

SUMMARY

To solve at least some of the above-mentioned drawbacks of current router usage modes, the present disclosure provides a router, a method for the router, a computer-readable medium, and an apparatus, capable of providing a plurality of networks for different users to access to meet network connection demands of different users, while ensuring the isolation and security among respective user networks.

According to one aspect of the present disclosure, there is provided a router, comprising: a memory having instructions stored thereon; and a processor configured to execute the instructions stored on the memory to cause the router to perform at least the following: providing a plurality of private subnets isolated from one another, each of the plurality of private subnets having corresponding network configuration information; and in response to a request to perform a first processing on network configuration information from a first user device connected to a first private subnet of the plurality of private subnets, performing the first processing on only first network configuration information corresponding to the first private subnet.

In some embodiments, the processor is further configured to execute instructions stored on the memory to cause the router to perform at least the following: in response to a request to access network configuration information from the first user device, sending only the first network configuration information to the first user device.

In some embodiments, the processor is further configured to execute instructions stored on the memory to cause the router to perform at least the following: in response to a request to modify network configuration information from the first user device, modifying only the first network configuration information.

In some embodiments, the processor is further configured to execute instructions stored on the memory to cause the router to perform at least the following: providing a shared subnet isolated from the plurality of private subnets; and in response to a request to perform a second processing on network configuration information corresponding to one or more of the plurality of private subnets from a second user device connected to the shared subnet, performing the second processing on the network configuration information corresponding to the one or more private subnets. Note that the adjectives first and second with reference to processing are used to distinguish instances of processing, of either the same or different kind, but not to describe timing or sequence of instances of the processing relative to one another.

In some embodiments, the processor is further configured to execute instructions stored on the memory to cause the router to perform at least the following: after performing the first processing on the first network configuration information, in response to the request to perform the second processing on network configuration information from the second user device, forbidding performing the second processing on the first network configuration information. Forbidding performing includes preventing or omitting initiation of processing.

In some embodiments, the processor is further configured to execute instructions stored on the memory to cause the router to perform at least the following: in response to a private subnet create request from the second user device, providing the plurality of private subnets.

In some embodiments, the router can be used with a repeater, and the processor is further configured to execute instructions stored on the memory to cause the router to perform at least the following: configuring the repeater connected to the router to relay and amplify one or more of the plurality of private subnets.

In some embodiments, the router can be used with a repeater, and the processor is further configured to execute instructions stored on the memory to cause the router to perform at least the following: configuring the repeater connected to the router to relay and amplify only a private subnet of the plurality of private subnets at a location where the repeater is to be deployed.

In some embodiments, the plurality of private subnets are respectively allocated in different Internet Protocol (IP) network segments.

In some embodiments, the network configuration information comprises at least one of: an access password; and router additional network function settings.

In some embodiments, the first network configuration information includes an access password, and the processor is further configured to execute instructions stored on the memory to cause the router to perform at least the following: determining that a network connection request to connect to the first private subnet from the first user device includes an access password corresponding to the first private subnet; and connecting the first user device to the first private subnet.

According to another aspect of the present disclosure, there is provided a method for a router, the method comprising: providing a plurality of private subnets isolated from one another, each of the plurality of private subnets having corresponding network configuration information; and in response to a request to perform a first processing on network configuration information from a first user device connected to a first private subnet of the plurality of private subnets, performing the first processing on only first network configuration information corresponding to the first private subnet.

In some embodiments, the method further comprises: providing a shared subnet isolated from the plurality of private subnets; and in response to a request to perform a second processing on network configuration information corresponding to one or more of the plurality of private subnets from a second user device connected to the shared subnet, performing the second processing on the network configuration information corresponding to the one or more private subnets.

In some embodiments, the method further comprises: after performing the first processing on the first network configuration information, in response to the request to perform the second processing on network configuration information from the second user device connected to the shared subnet, forbidding performing the second processing on the first network configuration information.

In some embodiments, the method further comprises: in response to a private subnet create request from the second user device, providing the plurality of private subnets.

According to yet another aspect of the present disclosure, there is provided a non-transitory computer-readable medium for use with a processor, having instructions stored thereon that, when executed by the processor, perform the aforementioned method for a router according to an embodiment of the present disclosure.

According to yet another aspect of the present disclosure, there is provided a communication system comprising a router according to an embodiment of the present disclosure and a repeater communicatively connected to the router and configured to relay and amplify one or more of the plurality of private subnets provided by the router.

According to yet another aspect of the present disclosure, there is provided an apparatus comprising means for performing the aforementioned method for a router according to an embodiment of the present disclosure.

BRIEF DESCRIPTION OF THE DRAWINGS

To better understand the present disclosure and to illustrate how the present disclosure is implemented, the present disclosure will now be described by way of example and with reference to the accompanying drawings, wherein.

Note that like reference numerals refer to corresponding parts throughout the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
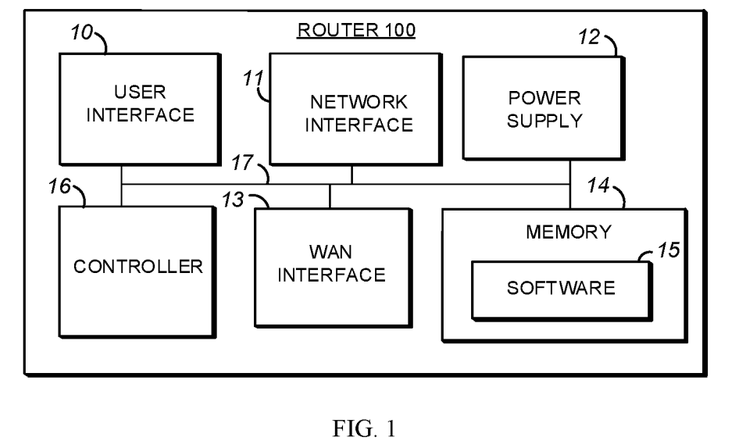
FIG. 1 illustrates an exemplary configuration block diagram of a router according to an embodiment of the present disclosure.

FIG. 1 illustrates an exemplary configuration block diagram of a router 100 according to an embodiment of the present disclosure. While referred to herein as a router, the router 100 can be, for example, a hardware electronic device that can combine the functions of a modem, an access point, a Layer 2/Layer 3 switch, a gateway and/or a router. It is also contemplated by the present disclosure that the router 100 can include the functionality of, but is not limited to, an IP/QAM Set Top Box (STB) or Smart Media Device (SMD) that is capable of decoding audio/video content, and playing Over-The-Top (OTT) media service or Multiple Systems Operator (MSO) provided content.

As shown in FIG. 1, the router 100 includes a user interface 10, a network interface 11, a power supply 12, a Wide Area Network (WAN) interface 13, a memory 14, and a controller 16. The user interface 10 can include, but is not limited to, push buttons, a keyboard, a keypad, an LCD, a CRT, a TFT, an LED, an HD or other similar display device including a display device having touch screen capabilities so as to allow interaction between a user and the router.

The network interface 11 may include various network cards, and circuitry implemented in software and/or hardware to enable communications with repeater devices or user devices using wired or wireless protocols. The wired protocol is, for example, any one or more of an Ethernet protocols, Multimedia over Coax Alliance (MoCA) specification protocols, USB protocols, or other wired communication protocols. The wireless protocols are, for example, any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands or 60 GHz bands comprising RF4CE protocol, ZigBee protocol, Z-Wave protocol, or IEEE 802.15.4 protocol. In a case where the network interface uses wireless protocols, in some embodiments, the network interface 11 may include one or more antennas (not shown) or circuit nodes for coupling to one or more antennas. The router 100 may provide a local area network to a user device via the network interface 11. In some embodiments, the network interface 11 may include an Ethernet port, a MoCA port, or a Wi-Fi port provided on the router 100 for connecting with an Ethernet interface, a MoCA interface, or a Wi-Fi interface of a repeater device or user device, respectively, to provide corresponding functions. The Ethernet port may be a physical port configured on the router 100, for example, to connect and communicate with the Ethernet interface of the user device through a network cable. The MoCA port may be a physical port configured on the router 100 to interface and communicate with the MoCA interface of the user device via, for example, a coaxial cable. Additionally, the Wi-Fi interface may be, for example, a virtual port implemented by the controller of the router 100, wirelessly connecting to and communicating with the Wi-Fi interface of the user device via the one or more antennas.

The power supply 12 supplies power to the internal components of the router 100 through the internal bus 17. The power supply 12 can be a self-contained power source such as a battery pack with an interface to be powered through an electrical charger connected to an outlet (e.g., either directly or by way of another device). The power supply 12 can also include a rechargeable battery that can be detached allowing for replacement such as a NiCd, a NiMH, a Li-ion, or a Li-pol battery. The WAN interface 13 may include various network cards, and circuitry implemented in software and/or hardware to enable communications between the router device and an Internet service provider or MSO.

The memory 14 includes a single memory or one or more memories or memory locations that include, but are not limited to, a Random Access Memory (RAM), a Dynamic Random Access Memory (DRAM), a Static Random Access Memory (SRAM), a Read Only Memory (ROM), an Erasable Programmable Read-Only Memory (EPROM), an Electrically Erasable Programmable Read-Only Memory (EEPROM), a flash memory, logic blocks of a FPGA, hard disk, or any other various layers of memory hierarchy. The memory 14 can be used to store any type of instructions, software, or algorithm including software 15 for controlling the general functions and operations of the router 100.

The controller 16 controls the general operations of the router 100 as well as performs management functions related to the other devices (such as repeaters and user devices) in the network. The controller 16 can include, but is not limited to, a CPU, a hardware microprocessor, a hardware processor, a multi-core processor, a single core processor, a microcontroller, an Application Specific Integrated Circuit (ASIC), a DSP, or other similar processing device capable of executing any type of instructions, algorithms, or software for controlling the operation and functions of the router 100 in accordance with the embodiments described in the present disclosure. The controller 16 may be various implementations of digital circuitry, analog circuitry, or mixed signal (a combination of analog and digital) circuitry that perform functionalities in a computing system. The controller 16 may include, e.g., such a circuit like an Integrated Circuit (IC), portions or circuits of an individual processor core, an entire processor core, an individual processor, a programmable hardware device such as a Field Programmable Gate Array (FPGA), and/or a system including a plurality of processors.

Communications between the components (e.g., 10-12, 14, and 16) of the router 100 may be established using the internal bus 17.

Although the router 100 is described using specific components, in alternative embodiments, different components may be present in the router 100. For example, the router 100 may include one or more additional controllers, memories, network interfaces, WAN interfaces, and/or user interfaces. In addition, one or more of the components may not be present in the router 100. Furthermore, in some embodiments, the router 100 may include one or more components not shown in FIG. 1. Additionally, although individual components are shown in FIG. 1, in some embodiments, some or all of given components may be integrated into one or more of other components in the router 100. Furthermore, any combination of analog and/or digital circuits may be used to implement the circuits and components in the router 100.

Figure 2:
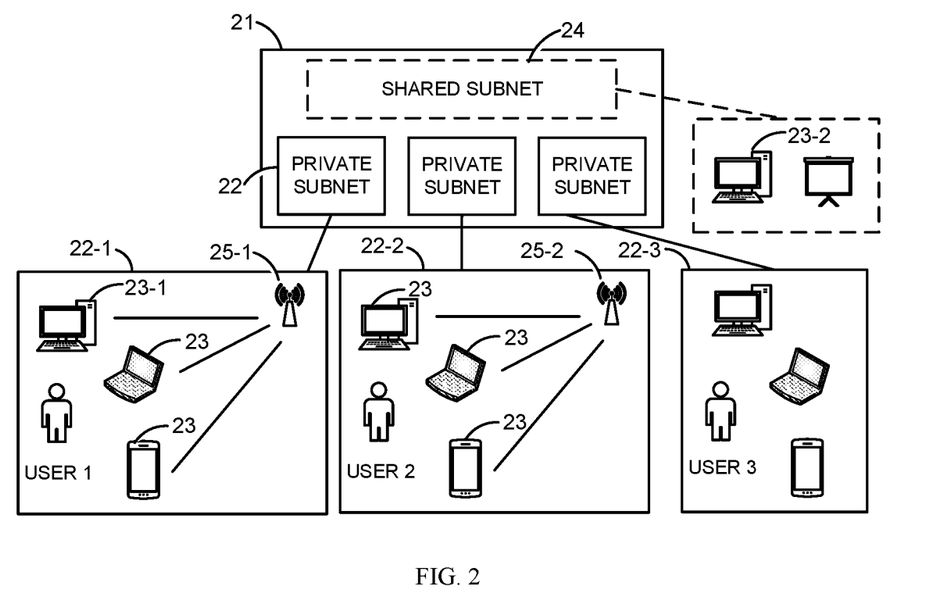
FIG. 2 illustrates a schematic diagram of a network deployment provided by a router according to an embodiment of the present disclosure.

FIG. 2 illustrates a schematic diagram of a network deployment provided by a router according to an embodiment of the present disclosure. A local area network (LAN) 21 is provided by a router according to an embodiment of the present disclosure using its network interface. For example, the LAN 21 may be a collection of networks provided by the router 100 as shown in FIG. 1 using its Ethernet port, MoCA port, Wi-Fi port, and/or other network interfaces. In some embodiments, the LAN 21 is a Wireless Local Area Network (WLAN) operating in accordance with any IEEE 802.11 Wi-Fi protocol.

In order to provide dedicated networks for a plurality of different users, a plurality of separated private subnets 22 are allocated within a network space of the LAN 21. As shown in FIG. 2, User 1 through User 3 are each provided with a respective private subnet of the three private subnets 22-1, 22-2, and 22-3. A user device 23 of a user accesses a private subnet corresponding to the user through its respective network interface, and can thereby communicate with an external network (e.g., a WAN) through the router. A plurality of user devices within a private subnet may communicate directly, including performing direct communications using physical layer devices such as transmission media, repeaters, hubs, and the like. The plurality of private subnets 22 are isolated from one another. Specifically, user device within one private subnet cannot communicate directly with user device within another private subnet but need to use the routing and forwarding functions of the router, which however may be configured to disable, prevent, or otherwise not allow, communications from one private subnet to another, thereby achieving mutual isolation among the plurality of private subnets. A method of providing a plurality of private subnets by the router will be described in detail later with reference to FIG. 3.

It should be understood that although three private subnets are shown in FIG. 2, the number of private subnets may be set to two or more as needed. Also, the number of private subnets is not limited to be provided according to the number of users, but may be provided according to other practical needs. For example, in a usage scenario of co-tenancy, the number of private subnets may be set according to the number of rooms.

Figure 3:
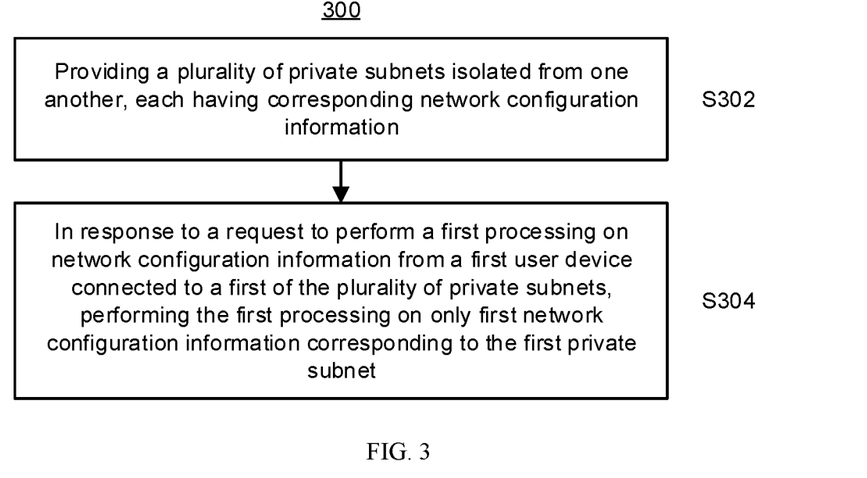
FIG. 3 illustrates an exemplary flowchart of a method for a router according to an embodiment of the disclosure.

FIG. 3 illustrates a flowchart of a method 300 for a router according to an embodiment of the disclosure. The method 300 may be used, for example, for the router 100 as shown in FIG. 1. Hereinafter, the router and the method for the router according to the embodiment of the present disclosure will be described in detail below with reference to FIGS. 1 and 3.

As shown in FIG. 3, in step S302, the controller 16 provides a plurality of private subnets isolated from one another through the network interface 11, each of the plurality of private subnets having corresponding network configuration information.

In some embodiments, networks provided by different subsets of all network interfaces of the same router may be used as different private subnets. The subsets of network interfaces may be divided by individual physical port or by type of the port. For example, the plurality of private subnets may be divided by a number of Ethernet ports of the router or by types of Ethernet ports, MoCA ports, and Wi-Fi ports of the router. In some embodiments, the plurality of private subnets may also be provided by extending one network port into a plurality of virtual network ports. For example, a plurality of different Wi-Fi subnets may be extended from one Wi-Fi port of the router to serve as multiple private subnets for user device to access. Each private Wi-Fi subnet may have a corresponding network identifier (e.g., a Service Set Identifier (SSID)). The private Wi-Fi subnets may operate at different frequencies to avoid interference with one another.

In some embodiments, the plurality of private subnets are respectively allocated to different Internet Protocol (IP) network segments. The router 100 may ensure that network addresses of different private subnets are different, i.e., in different IP network segments, by setting an IP address range and a subnet mask assigned to each private subnet (and further, to a network interface providing the private subnet). For example, in FIG. 2, the network addresses of private subnets 22-1, 22-2, and 22-3 may be 192.168.27.X, 192.168.28.X, 192.168.29.X, respectively, while the subnet masks are all 255.255.0.0. In a further embodiment, the router 100 may determine that a data packet is going from one private subnet to another by identifying a source IP address and destination IP address of the data packet and then block the data packet.

In some embodiments, the network configuration information of a private subnet may include an access password and/or router additional network function settings. The access password may be used for a user device to access the private subnet. In some embodiments, in a case where a private subnet is provided with an access password, the controller 16 of the router 100 may determine whether a network connection request to connect to that private subnet from a user device includes the access password corresponding to that private subnet, and in response to determining that the network connection request includes the corresponding access password, connect the user device to that private subnet. Setting a corresponding access password for a private subnet can increase the security of the subnet, because only a proprietary user of the private subnet may be informed of the access password, thereby preventing other users from connecting to the private subnet.

The router additional network function settings are information for setting additional network functions of the router other than conventional routing and forwarding functions. The additional network functions may be, for example, a parental control function, a demilitarized zone (DMZ) function, a port mapping function, or the like. Adding the additional network functions to the private subnet can enrich the usage scenario of the private subnet. In some further embodiments, each private subnet may have the same router additional network function settings. In other embodiments, each private subnet may have different router additional network function settings, thereby realizing a personalized design of the private subnet.

In some embodiments, a private subnet create command and/or the network configuration information of the private subnets may be pre-stored in a memory of the router (e.g., memory 14 in FIG. 1) or an external server or a cloud storage in the form of program instructions, and the controller 16 may execute the program instructions to automatically generate a plurality of private subnets and/or perform corresponding network configurations. In other embodiments, the private subnet create command and/or the network configuration information of the private subnets may be input by a user through an interaction interface such as an application program or a Web-based graphical user interfaces (GUI), and the controller 16 only generates a plurality of private subnets and/or performs corresponding network configurations in response to the input. The network configuration information of the private subnets input by the user may also be stored by the controller 16 in the memory of the router (e.g., memory 14 in FIG. 1) or the external server or the cloud storage for later retrieval.

As shown in FIG. 3, in step S302, in response to a request to perform a first processing on network configuration information from a first user device connected to a first of the plurality of private subnets, the controller 16 performs the first processing on only first network configuration information corresponding to the first private subnet.

The first user device may be any electronic device having at least one network interface. For example, the first user device may be: a desktop computer, a laptop computer, a server, a mainframe computer, a cloud-based computer, a tablet computer, a smart phone, a smart watch, a wearable device, a consumer electronic device, a portable computing device, a radio node, a router, a switch, an access point, and/or other electronic devices. As described previously, the first user device communicates with a network port of the router's network interface corresponding to one private subnet using its network interface so as to connect to the private subnet. For example, the first user device may use a network cable connection between its Ethernet interface and an Ethernet port of the router to access a private subnet corresponding to the Ethernet port. As another example, the first user device may scan a plurality of Wi-Fi private subnets provided by the router, and select one Wi-Fi private subnet for connection based on the SSID. As described previously, in a further example, if the network configuration information of the private subnet comprises an access password, the first user device further needs to provide the access password and connect to the private subnet only after a successful authentication.

It should be understood that the "first private subnet" means any one of a plurality of private subnets, wherein "first" is used merely for convenience of description and is not intended to emphasize the order. Likewise, the "first user device" may be any one of user device connected to the first private subnet, wherein "first" is used merely for convenience of description and is not intended to emphasize the order.

In some embodiments, the router 100 can be used together with one or more repeaters such that each of one or more private subnets of the plurality of private subnets may be relayed and amplified by a respective repeater. A repeater is a network device that amplifies a wired or wireless network signal it has received and transmits the amplified signal. A repeater may also be referred to as an extender because it can extend the coverage of the network. As shown in FIG. 2, repeaters 25-1 and 25-2 may access to private subnet 22-1 and private subnet 22-2, respectively, and communications between user device 23 in the private subnets 22-1 and 22-2 and the router 100 may be respectively passed through the repeaters 25-1 and 25-2, and amplified by the respective repeaters. Although only the repeaters 25-1 and 25-2 are shown in FIG. 2, it should be understood that other private subnets may also contain repeaters and there may be multiple repeaters in one private subnet. In some examples, the repeater may be configured to relay and amplify only one private subnet. In other examples, the repeater may be configured to relay and amplify more than one private subnet. For example, a dual-frequency Wi-Fi repeater may relay and amplify two Wi-Fi subnets at 2.4 GHz and 5 GHz simultaneously. Therefore, according to another aspect of the disclosure, a communication system including the router 100 and one or more repeaters communicatively connected to the router can also be provided.

Typically, the repeater does not change network configuration information of a network it relays and amplifies. In some cases, however, the repeater may change at least part of the network configuration information of the relayed and amplified network. For example, a Wi-Fi repeater can create a new Wi-Fi network that has a different SSID and access password than the original Wi-Fi network. In this case, a combination of the original network configuration information and the changed network configuration information may be used as network configuration information for the private subnet.

In some embodiments, the repeater may be pre-configured to relay and amplify which private subnet(s) according to program instructions stored in an internal or external or cloud storage. In other embodiments, the repeater may be connected to the router in a wired or wireless way and configured by the router to determine a private subnet to be relayed and amplified. For example, the repeater may be connected to the router through a network cable, and a user may set the repeater through an application program or a Web-based GUI to specify a private subnet to be relayed and amplified.

In a further embodiment, the controller 16 of the router 100 may configure a repeater connected to the router to relay and amplify only a private subnet at a location where the repeater is to be deployed. For example, in FIG. 2, if the repeater 25-1 is to be deployed at the location (e.g., room) of the user 1, the repeater 25-1 can be configured by the router 100 to relay and amplify only the private subnet 22-1 to be used at the location of the user 1. Accordingly, the repeater 25-2 deployed at the location of the user 2 may be configured by the router 100 to relay and amplify only the private subnet 22-2. Therefore, the plurality of private subnets can be deployed according to locations, and the isolation and security of the private subnets are further enhanced.

Returning to FIG. 3, in step S304, in response to a request to perform a first processing on network configuration information from a first user device connected to a first private subnet of the plurality of private subnets, the controller 16 performs the first processing on only first network configuration information corresponding to the first private subnet.

The first user device connected to the first private subnet may request the first processing on the network configuration information of the first private subnet. In some embodiments, the first processing may include access and/or modification. In some embodiments, in response to receiving such a request, the controller 16 may determine, in accordance with a network port receiving the request or a source address included in the request, that the first user device sending the request is connected to the first private subnet, and thereby perform the first processing on only the first network configuration information corresponding to the first private subnet.

In some embodiments, in response to receiving the request to access network configuration information from the first user device, the controller 16 may send only the first network configuration information to the first user device. For example, the controller 16 may retrieve only the first network configuration information from the memory 14 and send a retrieval result to the first user device. The first network configuration information may be presented to the user at the first user device through an interaction interface, such as an application program or a Web-based GUI.

In some embodiments, in response to receiving a request to modify network configuration information from the first user device, the controller 16 may modify only the first network configuration information.

In some embodiments, the user device may request access to and modification of network configuration information. As a response, the controller 16 may send and modify only the first network configuration information.

According to the router of the present disclosure, by only performing a processing on network configuration information corresponding to a private subnet to which a requesting user device is connected, it is possible to prevent user device within one private subnet from processing network configuration information of another private subnet, so as to further ensure the isolation and security of the private subnets. The description will be given by taking FIG. 2 as an example. For example, the user device 23-1 connected to the private subnet 22-1 is only permitted to perform a processing on network configuration information of the private subnet 22-1, but cannot perform a processing on network configuration information of other private subnets 22-2 and 22-3. Further, in a case where the network configuration information comprises an access password, the user device 23-1 can modify only an access password of the private subnet 22-1, but cannot modify access passwords of the other two private subnets. In this way, the user device of the user 1 can be prevented from privately accessing private networks of the user 2 and the user 3, and from bringing risks to the security of the private networks of the user 2 and the user 3.

Next, an exemplary flowchart of a method 400 for a router according to another embodiment of the present disclosure is described with reference to FIG. 4. The method 400 may be used, for example, for the router 100 as shown in FIG. 1. In the method 400, steps S302 and S304 are the same as the method 300 described with reference to FIG. 3, so the same reference numerals are attached and the description is omitted. Hereinafter, only steps S402 and S404 different from the method 300 in FIG. 3 will be described.

Figure 4:
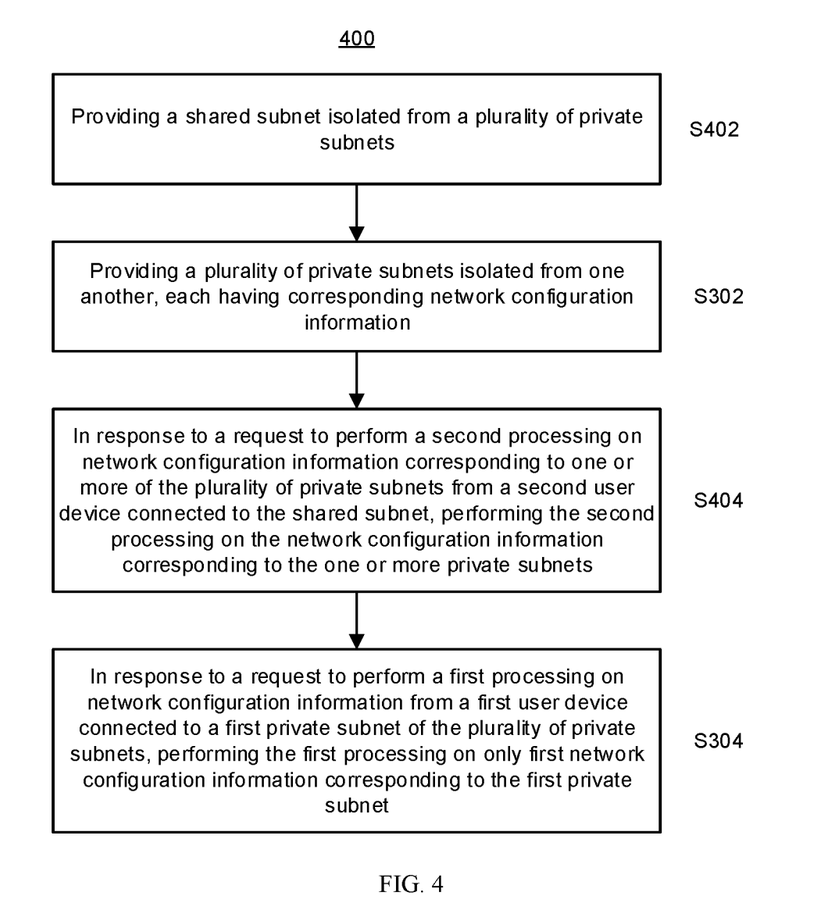
FIG. 4 illustrates an exemplary flowchart of a method for a router according to another embodiment of the present disclosure.

As shown in FIG. 4, in some embodiments, in step S402, a shared subnet isolated from a plurality of private subnets may be provided. In FIG. 4, the step S402 is illustrated as being performed before step S302, but may also be performed in any order (including simultaneously) with respect to step S302 and step S304.

As with the isolation among the plurality of private subnets described above, isolation between the shared subnet and the private subnets also means that user device connected to the shared subnet cannot communicate directly with user devices within the private subnets. In some embodiments, the shared subnet and private subnets may be set to be provided by different network ports (including extended virtual network ports) on the router. For example, the shared subnet and the plurality of private subnets may all be Wi-Fi networks but have different SSIDs and operate at different frequencies. In some embodiments, the isolation may be achieved by setting the shared subnet in a different IP network segment than the private subnets. For example, in FIG. 2, in an example where the network addresses of the private subnets 22-1, 22-2, and 22-3 are respectively 192.168.27.X, 192.168.28.X, 192.168.29.X and the subnet masks are all 255.255.0.0, the IP address of the shared subnet may be set to 192.168.0. X.

In some embodiments, the controller 16 may automatically provide the shared subnet according to program instructions stored in a memory of the router or an external server or a cloud storage. In other embodiments, the controller 16 may provide the shared subnet in response to a command to create the shared subnet input by a user through an interaction interface such as an application program or a Web-based GUI.

As shown in FIG. 4, in some embodiments, in step S404, in response to a request to perform a second processing on network configuration information corresponding to one or more of the plurality of private subnets from a second user device connected to the shared subnet, performing the second processing on the network configuration information corresponding to the one or more private subnets. In FIG. 4, the step S404 is illustrated as being performed between step S302 and step S304, but may be performed in any other order, as long as ensuring that step S404 follows step S402.

It should be understood that the "second user device" and "second processing" are used merely for convenience of description and are not intended to limit the order. In some embodiments, the second user device may be a different user device than the first user device. However, except that the second user device is connected to the shared subnet, other features and functions are the same as those of the first user device, so the description thereof is not be repeated. In other embodiments, the second user device may be the same user device as the first user device. That is, the user device may switch between the shared subnet and the private subnets. Likewise, the "second processing" and "first processing" are merely distinguished by name, and the foregoing description of the "first processing" is equally applicable to the "second processing".

Similar to the private subnet, the shared subnet may also have corresponding network configuration information. In some embodiments, the network configuration information may include an access password and/or router additional network function settings (e.g., settings for functions such as parental control functions, DMZ functions, or port mapping functions). In some embodiments, the second user device may connect to the shared subnet using an access password in a similar manner to that described previously. The second user device connected to the shared subnet may request a second processing on the network configuration information of the shared subnet (e.g. through an interaction interface such as an application program or a Web-based GUI). The controller 16 may permit the processing on the network configuration information of the shared subnet.

It can be seen that one important difference between the shared subnet and the private subnets is that user device connected to the shared subnet can process network configuration information of any private subnet (and the shared subnet), whereas user device connected to a private subnet can only process network configuration information of the private subnet to which it connects. The shared subnet may be the same as the private subnets in other features.

By providing the shared subnet, the router according to the present disclosure is able to provide management functionality for any private subnet. FIG. 2 is taken as an example for illustration. For example, the user device 23-2 connected to the shared subnet 24 may be permitted to access and/or modify network configuration information of any one or more of the private subnets 22-1 to 22-3 and the shared subnet. Thereby, macro-management of the LAN 21 can be provided. On the other hand, the router according to the present disclosure can enrich the usage scenario of the whole local area network. For example, in a case of multi-roommate co-tenancy, some shared electronic devices, such as a television, a projector, etc., may not be suitable to be connected to any roommate's private subnet, but rather may be suitable to be connected to the shared subnet. When a roommate wants to perform a projection on the television through a mobile phone, the mobile phone connected to the private subnet cannot directly communicate with the television connected to the shared subnet. In such a case, the mobile phone can be switched to the shared subnet for data communications with the television in the same subnet.

In some cases, it may be advantageous to define step S402 as being performed before step S302 (i.e., providing the shared subnet followed by providing the private subnets). In some embodiments, in response to a private subnet create request from the second user device connected to the shared subnet, the controller 16 may provide a plurality of private subnets. Thus, the shared subnet can serve as a portal to the function of creating the private subnets. In a further embodiment, the private subnet create request may further include a number of private subnets and network configuration information of the respective private subnets. A specific example is illustrated with reference to FIG. 2. To be compatible with the conventional home mode, the router 100 may first provide only one shared subnet 24. The user device 23-2 is connected to the shared subnet and may access a configuration information interface of the shared subnet through an application program or a Web-based GUI. The user may select whether a family mode or a private subnet mode is enabled on the user device 23-2. If the family mode is enabled, the router operates in a conventional manner. If the private subnet mode is enabled, the user can further continue to set the number of private subnets and network configuration information (e.g., an access password or various router additional network function settings) for each private subnet. In a case where the private subnets are WLANs, it is also possible to set different SSIDs for the respective private subnets. Next, the controller 16 provides the corresponding private subnets in response to receiving these setting information in step S302.

Further, in some embodiments, the controller 16 may allocate bandwidth resources for the shared subnet and the private subnets as desired. Unlike in the conventional home mode of a router in which a primary network is preferentially allocated with bandwidth resources and bandwidth resources for a guest network are limited, the router according to the present disclosure can more flexibly satisfy various network use requirements.

Next, an exemplary flowchart of a method 500 for a router according to another embodiment of the present disclosure is described with reference to FIG. 5. The method 500 may be used, for example, for the router 100 as shown in FIG. 1. In the method 500, steps S302 and S304 are the same as the method 300 described with reference to FIG. 3, and steps S402 and S404 are the same as the method 400 described with reference to FIG. 4, so the same reference numerals are attached and the description is omitted. Hereinafter, only the differences from the method 300 in FIG. 3 and the method 400 in FIG. 4 will be described.

Figure 5:
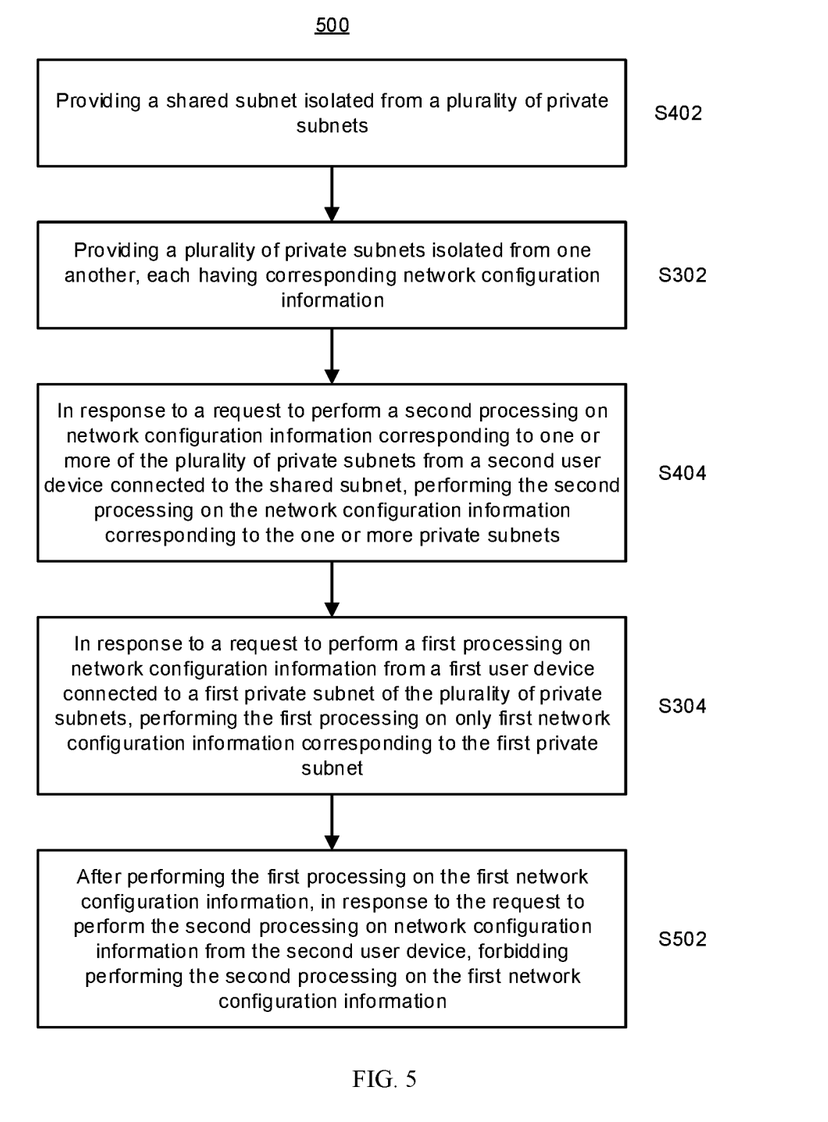
FIG. 5 illustrates an exemplary flowchart of a method for a router according to another embodiment of the disclosure.

As shown in FIG. 5, in some embodiments, in step S502, after performing the first processing on the first network configuration information, in response to the request to perform the second processing on network configuration information from the second user device, the controller 16 may forbid performing the second processing on the first network configuration information.

As previously described, in the method 400, the user device connected to the shared subnet may perform a processing on network configuration information of any private subnet. However, according to the method 500, once a user device is connected to a private subnet and performs a processing (e.g., access and/or modify) on network configuration information of the private subnet, a user device thereafter connected to the shared subnet may no longer be able to perform a processing on the network configuration information of the private subnet. Therefore, in the method 500, if step S404 is executed after step S304, it is necessary to combine step S404 and step S502, i.e. the controller 16 only permits the second processing to be performed on the remaining network configuration information other than the first network configuration information of the network configuration information corresponding to the one or more private subnets.

Again, FIG. 2 is taken as an example for illustration. For example, initially, the user device 23-2 connected to the shared subnet 24 may be permitted to access and/or modify network configuration information of any one or more of the private subnets 22-1 to 22-3. However, if the user device 23-1 has been connected to the private subnet 22-1 and has accessed and/or modified its network configuration information, and the network configuration information of the private subnet 22-2 and the private subnet 22-3 has not been accessed or modified, the user device 23-2 will no longer be able to access and/or modify the network configuration information of the private subnet 22-1, but can still access and/or modify the network configuration information of the private subnet 22-2 and the private subnet 22-3. In a more specific example, the user device 23-2 may initially view access passwords of all the private subnets, and once the user device 23-1 modifies the access password of the network 22-1, the user device 23-2 will no longer view the access password of the network 22-1.

Therefore, the network configuration information of the private subnets can be privatized, and the security of the private subnets is further guaranteed.

The present disclosure may be implemented as any combination of an apparatus, a system, an integrated circuit, and a computer program on a non-transitory computer-readable recording medium. The one or more controllers may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described above and in the drawings. For example, the one or more memories stores software or algorithms with executable instructions and the one or more processors can execute a set of instructions of the software or algorithms in association for providing the plurality of private subnets of the router in accordance with the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term "computer-readable medium" refers to any computer program product, apparatus or device, such as a magnetic disk, optical disk, solid-state storage device, memory, and programmable logic devices (PLDs), used to provide machine instructions or data to a programmable data processor, including a computer-readable medium that receives machine instructions as a computer-readable signal.

By way of example, a computer-readable medium can comprise DRAM, RAM, SRAM, ROM, EEPROM, Compact Disc(CD)-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Additionally, the above description provides examples, and is not limiting of the scope, applicability, or configuration set forth in the claims. Changes may be made in the function and arrangement of elements discussed without departing from the spirit and scope of the disclosure. s. Various embodiments may omit, substitute, or add various procedures or components as appropriate. For instance, features described with respect to certain embodiments may be combined in other embodiments.

I claim:

1. A router, comprising:
   a memory having instructions stored thereon; and
   a processor configured to execute instructions stored on the memory to cause the router to perform at least the following:
      providing a plurality of private subnets isolated from one another, each of the plurality of private subnets having corresponding network configuration information stored at the router, wherein the corresponding network configuration information comprises an access password; and
      in response to a request to perform a first processing on network configuration information from a first user device connected to a first private subnet of the plurality of private subnets, performing the first processing on only first network configuration information corresponding to the first private subnet that the first user device is connected.

2. The router according to claim 1, wherein the processor is further configured to execute instructions stored on the memory to cause the router to perform at least the following:
   in response to a request to access network configuration information from the first user device, sending only the first network configuration information to the first user device.

3. The router according to claim 1, wherein the processor is further configured to execute instructions stored on the memory to cause the router to perform at least the following:
   in response to a request to modify network configuration information from the first user device, modifying only the first network configuration information.

4. The router according to any of claim 1, wherein the processor is further configured to execute instructions stored on the memory to cause the router to perform at least the following:
   providing a shared subnet isolated from the plurality of private subnets, wherein a second user device connected to the shared subnet can process network configuration of any of the plurality of private subnets and the shared subnet; and in response to a request to perform a second processing on network configuration information corresponding to one or more of the plurality of private subnets from the second user device connected to the shared subnet, performing the second processing on the network configuration information corresponding to the one or more private subnets.

5. The router according to claim 4, wherein the processor is further configured to execute instructions stored on the memory to cause the router to perform at least the following:

after performing the first processing on the first network configuration information, in response to the request to perform the second processing on network configuration information from the second user device, forbidding performing the second processing on the first network configuration information, wherein the second user device when connected to at least one private subnet of the plurality of privates subnets performed a process on network configuration information of the at least one private subnet.

6. The router according to claim 4, wherein the processor is further configured to execute instructions stored on the memory to cause the router to perform at least the following:

in response to a private subnet create request from the second user device, providing the plurality of private subnets.

7. The router according to claim 1, for use with a repeater, wherein the processor is further configured to execute instructions stored on the memory to cause the router to perform at least the following:

configuring the repeater connected to the router to relay and amplify one or more of the plurality of private subnets.

8. The router according to claim 1, for use with a repeater, wherein the processor is further configured to execute instructions stored on the memory to cause the router to perform at least the following:

configuring the repeater connected to the router to relay and amplify only a private subnet of the plurality of private subnets at a location where the repeater is to be deployed.

9. The router according to claim 1, wherein the plurality of private subnets are respectively allocated in different Internet Protocol (IP) network segments.

10. The router according to claim 1, wherein the network configuration information comprises at least one of:

an access password; and
router additional network function settings.

11. The router according to claim 1, wherein the first network configuration information includes an access password, and wherein the processor is further configured to execute instructions stored on the memory to cause the router to perform at least the following:

determining that a network connection request to connect to the first private subnet from the first user device includes an access password corresponding to the first private subnet; and
connecting the first user device to the first private subnet.

12. A method for a router, comprising:

providing a plurality of private subnets isolated from one another, each of the plurality of private subnets having corresponding network configuration information; and
in response to a request to perform a first processing on network configuration information from a first user device connected to a first private subnet of the plurality of private subnets, performing the first processing on only first network configuration information stored at the router corresponding to the first private subnet that the first user device is connected, wherein the corresponding network configuration information comprises an access password.

13. The method according to claim 12, further comprising:

providing a shared subnet isolated from the plurality of private subnets, wherein a second user device connected to the shared subnet can process network configuration of any of the plurality of private subnets and the shared subnet; and
in response to a request to perform a second processing on network configuration information corresponding to one or more of the plurality of private subnets from the second user device connected to the shared subnet, performing the second processing on the network configuration information corresponding to the one or more private subnets.

14. The method according to claim 13, further comprising:

after performing the first processing on the first network configuration information, in response to the request to perform the second processing on network configuration information from the second user device, forbidding performing the second processing on the first network configuration information, wherein the second user device when connected to at least one private subnet of the plurality of privates subnets performed a process on network configuration information of the at least one private subnet.

15. The method according to claim 13, further comprising:

in response to a private subnet create request from the second user device, providing the plurality of private subnets.

16. An apparatus, comprising means for performing the method according to any of claim 12.

17. A non-transitory computer-readable medium for use with a processor, having instructions stored thereon that, when executed by the processor, perform at least the following:

providing a plurality of private subnets isolated from one another, each of the plurality of private subnets having corresponding network configuration information, stored at the router, wherein the corresponding network configuration information comprises an access password; and
in response to a request to perform a first processing on network configuration information from a first user device connected to a first private subnet of the plurality of private subnets, performing the first processing on only first network configuration information corresponding to the first private subnet that the first user device is connected.

18. The non-transitory computer-readable medium according to claim 17, further having instructions stored thereon that, when executed by the processor, perform at least the following:

providing a shared subnet isolated from the plurality of private subnets, wherein a second user device connected to the shared subnet can process network configuration of any of the plurality of private subnets and the shared subnet; and in response to a request to perform a second processing on network configuration information corresponding to one or more of the plurality of private subnets from a second user device connected to the shared subnet, performing the second processing on the network configuration information corresponding to the one or more private subnets.

19. The non-transitory computer-readable medium according to claim 18, further having instructions stored thereon that, when executed by the processor, perform at least the following:

after performing the first processing on the first network configuration information, in response to the request to perform the second processing on network configuration information from the second user device, forbidding performing the second processing on the first network configuration information, wherein the second user device when connected to at least one private subnet of the plurality of privates subnets performed a process on network configuration information of the at least one private subnet.

20. The non-transitory computer-readable medium according to claim 18, further having instructions stored thereon that, when executed by the processor, perform at least the following:

in response to a private subnet create request from the second user device, providing the plurality of private subnets.

21. A communication system, comprising:

a router according to any of claim 1; and a repeater communicatively connected to the router and configured to relay and amplify one or more of the plurality of private subnets provided by the router.

22. The communication system according to claim 21, wherein the repeater is configured to relay and amplify only a private subnet of the plurality of private subnets provided by the router at a location where the repeater is to be deployed.

* * * * *